(12) United States Patent
Kloth (10) Patent No.: US 7,327,680 B1
(45) Date of Patent: Feb. 5, 2008

(54) METHODS AND APPARATUS FOR NETWORK CONGESTION CONTROL

(75) Inventor: Raymond J. Kloth, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1089 days.

(21) Appl. No.: 10/289,090

(22) Filed: Nov. 5, 2002

(51) Int. Cl.
*H04L 12/56* (2006.01)

(52) U.S. Cl. ............... 370/235; 370/412; 370/429; 709/213

(58) Field of Classification Search ............... None
See application file for complete search history.

(56) References Cited

U.S. PATENT DOCUMENTS

| | | | |
|---|---|---|---|
| 5,617,421 A | 4/1997 | Chin et al. | |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,852,602 A * | 12/1998 | Sugawara | 370/235.1 |
| 5,999,930 A | 12/1999 | Wolff | |
| 6,035,105 A | 3/2000 | McCloghrie et al. | |
| 6,101,497 A | 8/2000 | Ofek | |
| 6,188,694 B1 | 2/2001 | Fine et al. | |
| 6,202,135 B1 | 3/2001 | Kedem et al. | |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,226,771 B1 | 5/2001 | Hilla et al. | |
| 6,233,242 B1 * | 5/2001 | Mayer et al. | 370/412 |
| 6,260,120 B1 | 7/2001 | Blumenau et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,279,057 B1 * | 8/2001 | Westby | 710/52 |
| 6,295,575 B1 | 9/2001 | Blumenau et al. | |
| 7,042,842 B2 * | 5/2006 | Paul et al. | 370/229 |
| 7,085,846 B2 * | 8/2006 | Jenne et al. | 709/232 |
| 2002/0034187 A1 * | 3/2002 | Kalkunte et al. | 370/401 |
| 2002/0136230 A1 * | 9/2002 | Dell et al. | 370/416 |
| 2003/0117958 A1 * | 6/2003 | Nation et al. | 370/235 |
| 2004/0027987 A1 * | 2/2004 | Bergamasco et al. | 370/229 |

OTHER PUBLICATIONS

Tamir Y, Frazier G., *High Performance Multi-Queue Buffers For VLSI Communications Switches*, Proc. Of 15th Ann. Symp. On Comp. Arch., pp. 343-354, Jun. 1988.

Andrew S. Tenenbaum, *Computer Networks*, Third Edition ISBN 0-13-349945-6, © 1996 Prentice Hall.

* cited by examiner

*Primary Examiner*—Wing Chan
*Assistant Examiner*—Brian Roberts
(74) *Attorney, Agent, or Firm*—Beyer Weaver LLP (57) ABSTRACT

Methods and apparatus are provided for controlling congestion in a network such as a fiber channel network. Techniques are provided for detecting congestion at a shared resource such as a network node. When a controller sends data to a shared resource, the delay between sending the data and receiving a credit is measured. If the delay is significant, it is assumed that the path towards the destination associated with the data is congested and subsequent traffic from the port associated with the data is blocked.

33 Claims, 7 Drawing Sheets

METHODS AND APPARATUS FOR NETWORK CONGESTION CONTROL

BACKGROUND OF THE INVENTION

1. Field of the Invention

The present invention relates to network congestion control. More specifically, the present invention relates to methods and apparatus for detecting congestion and controlling congestion.

2. Description of Related Art

Many conventional network protocols use packet dropping to alleviate congestion at a shared resource such as a network node. In one example, a network node in an IP based network receives input data from multiple sources at a rate exceeding its output bandwidth. In conventional implementations, selected packets are dropped to allow transmission of remaining packets within the allocated output bandwidth. Packets can be dropped randomly or dropped using various selection criteria. The dropped packets are ultimately retransmitted under the control of a higher level protocol such as TCP.

In networks such as fibre channel networks, packet dropping is generally not allowed. Instead, networks such as fibre channel networks implement end-to-end and buffer-to-buffer flow control mechanisms. End-to-end and buffer-to-buffer flow control mechanisms do not allow a first network node to transmit to a second network node until a second network node is ready to receive a frame. The second network node typically indicates that it is ready to receive a frame by granting credits to the first network node. When frames are transmitted, credits are used. When no credits remain, the first network node can no longer transmit to the second network node. However, end-to-end and buffer-to-buffer flow control mechanisms provide only a very rough technique for controlling congestion, as the mechanism blocks all traffic along a particular link. Such blocking can quickly propagate upstream to other links in a fibre channel network topology. Some of these links might serve as corridors for paths that do not include the originally congested link. Hence, congestion at one link of one network path can sometimes cause blocking over a much wider portion of a fibre channel topology.

The end-to-end credit mechanism takes into account the availability of buffers in the receiving node. However, it does not react to changes in the network environment, so congestion and blocking on the network can still occur. Furthermore, the end-to-end credit mechanism is typically applied between end nodes exchanging Class 2 traffic. Most fibre channel devices, however, do not exchange Class 2 traffic. Consequently, both end-to-end and buffer-to-buffer credit mechanisms do not optimize or even attempt to optimize traffic flow in a network.

It is therefore desirable to provide methods and apparatus for improving congestion control at networks nodes in a network such as a fibre channel network with respect to some or all of the performance limitations noted above.

SUMMARY OF THE INVENTION

Methods and apparatus are provided for controlling congestion in a network such as a fibre channel network. Techniques are provided for detecting congestion at a shared resource such as a network node. When a controller sends data to a shared resource, the delay between sending the data and receiving a credit is measured. If the delay is significant, it is assumed that the path towards the destination associated with the data is congested and subsequent traffic from the port associated with the data is blocked.

In one embodiment, a method for controlling congestion in a fibre channel network is provided. A received data sequence is identified at a buffer controller in a fibre channel network. The received data sequence has a source corresponding to one of a plurality of ports coupled to the buffer controller and a destination reachable through a shared resource coupled to the buffer controller. The shared resource is used by traffic associated with the plurality of ports coupled to the buffer controller to reach a plurality of destinations. The received data sequence is forwarded to the shared resource. A transmission credit is received from the shared resource. The port associated with the received data sequence is blocked if the transmission credit is not provided by the shared resource within a predetermined period of time.

In another embodiment, an apparatus for controlling congestion in a fibre channel network is provided. The apparatus includes a plurality of input ports and a buffer controller. The plurality of input ports are configured to receive data sequences having destinations reachable through a shared resource. The buffer controller is configured to pull a received data sequence from one of the plurality of input ports, forward the received data sequence to the shared resource, and receive a transmission credit from the shared resource. The input port associated with the received data sequence is blocked if the transmission credit is not provided by the shared resource within a predetermined period of time.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present invention relates to controlling congestion in a network. More specifically, the present invention relates to methods and apparatus for managing congestion in a network.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel used in a storage area network. However, it should be noted that the techniques of the present invention can be applied to a variety of different protocols and networks. Further, the solutions afforded by the invention are equally applicable to non-fibre channel networks. In one example, the techniques can apply to networks that generally do not allow packet dropping, although the techniques of the present invention can apply to a variety of different networks including IP networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Methods and apparatus are provided for alleviating congestion at a shared resource such as a network node. The congestion can lead to delays in transmitting various types of data. In particular, congestion at a network node using fibre channel can be particularly deleterious because effects such as cascading congestion and head-of-line blocking. Consequently, techniques are provided for detecting congestion at a shared resource. In one example, a data unit is sent to a shared resource and a timer is used to track the period of time between the transmission of data and the receipt of a credit from the shared resource. If the period of time exceeds a predetermined amount of time, an assumption is made that the path to the destination associated with the data is congested. The source, typically a port, associated with the data unit is then blocked. In the following discussion, the shared resource will be described as a network node. However, it should be noted that the shared resource may be variety of mechanisms that traffic from multiple sources use to reach multiple destinations. In one example, the shared resource may be a component on a particular switch. Any component or mechanisms that data blocks from multiple sources use to access multiple destinations in a network is referred to herein as a shared resource. In one example, a shared resource may have bottleneck characteristics.

Figure 1:
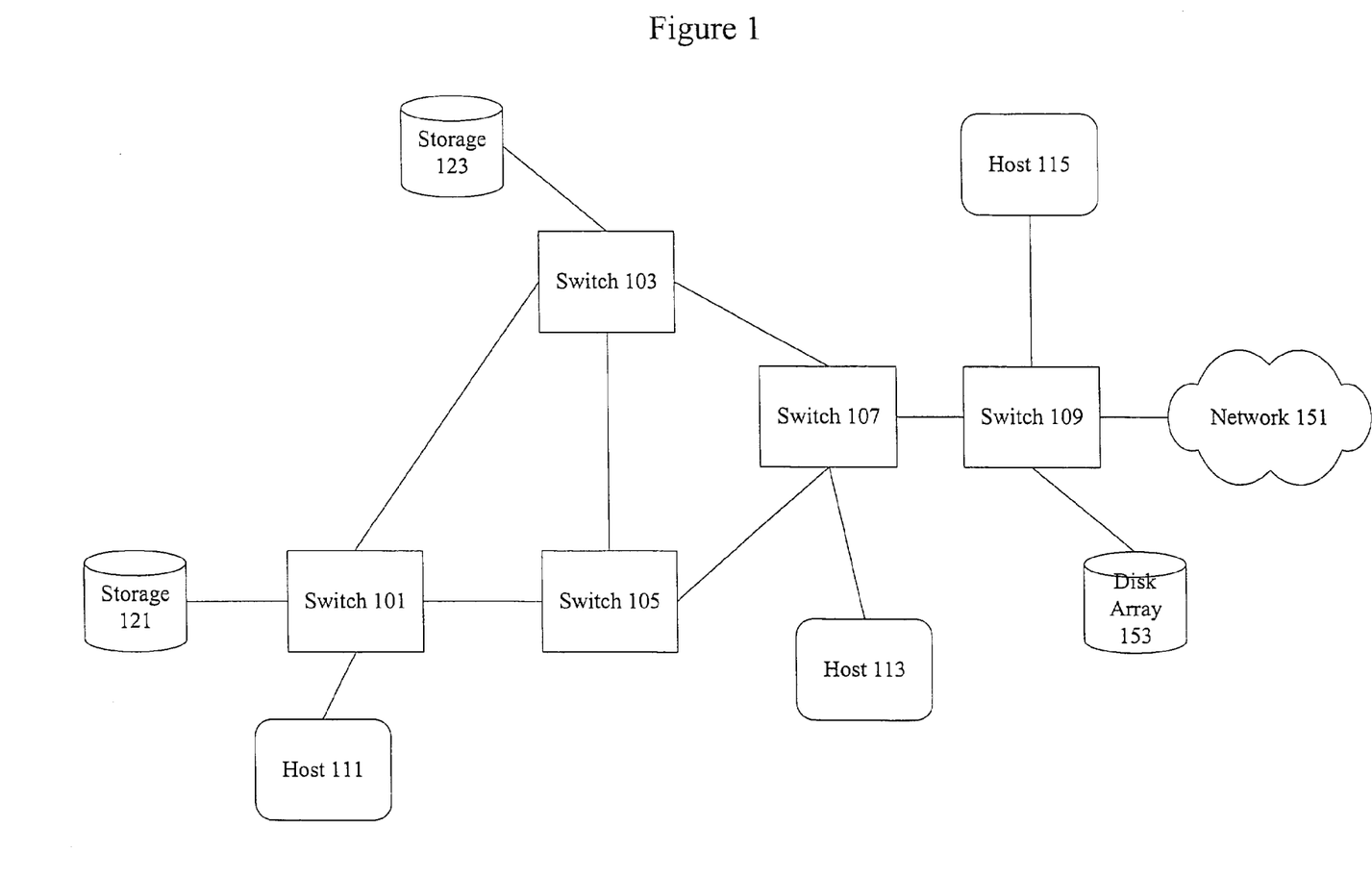
FIG. 1 is a diagrammatic representation of a network that can use the techniques of the present invention.

FIG. 1 is a diagrammatic representation of a network that can use the techniques of the present invention. Although the techniques of the present invention will be discussed in the context of fibre channel in a storage area network, it should be noted as indicated above that the techniques of the present invention can be applied to a variety of contexts including various local and wide area networks. Various techniques can be applied in any network where a single network node can act as a point of congestion for multiple flows or paths. FIG. 1 shows a storage area network implemented using fibre channel. A switch 101 is coupled to switches 103 and 105 as well as to a host 111 and storage 121. In one embodiment, host 111 may be a server or client system while storage 121 may be single disk or a redundant array of independent disks (RAID). Interconnected switches 103 and 105 are both coupled to switch 107. Switch 107 is connected to host 113 and switch 103 is connected to storage 123. Switch 109 is connected to host 115, switch 107, disk array 153, and an external network 151 that may or may not use fibre channel. In order for a host 111 to access network 151, several paths may be used. One path goes through switch 103 while another path goes through switch 105. However, congestion at switch 109 can slow down communication between a host 111 and a network 151.

As noted above, when a switch or router in a conventional IP network is congested, packets are dropped. Packets may be dropped randomly or selectively dropped with some degree of intelligence. By dropping packets, flows that were consuming a large amount of bandwidth will generally have more packets dropped than flows that were consuming a smaller amount of bandwidth. Although flow rates through the congested switch or router will be reduced with the dropping of packets, packets will get through the switch 109 to network 151. Congestion at switches 103 and 105 is not introduced because of congestion at switch 107 or switch 109.

Fibre channel, however, does not allow the dropping of packets. Instead, when a switch 109 is congested because of various reasons such as the failure or inability of a network 151 to receive more frames, a buffer-to-buffer credit mechanism is used to control traffic flow from switch 107 to switch 109. In typical implementations, a shared resource such as a switch 109 allocates a predetermined number of credits to switch 107. Every time the switch 107 transmits frames to switch 109, credits are used. A switch 109 can then allocate additional credits to switch 107 when the switch 109 has available buffers. When a switch 107 runs out of credits, it can no longer transmit to switch 109. Because of the failure or inability of a network 151 to receive more frames, switch 109 and consequently switch 107 can not transmit to network 151. It should be noted that although network 151 is described as a point of congestion in one embodiment, in other embodiments, a disk array 153, a component within a switch, or a host 115 may be a source of congestion.

A buffer-to-buffer credit mechanism is a very rough way of reducing traffic flow to a switch 109. The credit mechanism not only prevents traffic from traveling from switch 107 to switch 109 and subsequently to network 151, but it also prevents traffic from flowing from switch 107 to switch 109 to host 115 even though host 115 and its associated link may have the bandwidth to receive additional frames from switch 109. The buffer-to-buffer credit mechanism can result in the blocking of traffic traveling to an uncongested destination such as host 115. In one example, a host 111 may be communicating with a congested network 151. Because of the congestion in network 151, switch 109 queues a large number of frames from host 111 and consequently uses the buffer-to-buffer credit mechanism to prevent switch 107 from transmitting any more frames whether the frames are from a host 111 or a host 113.

A host 113, on the other hand, may be merely attempting to transmit a few frames to a host 115. Because network congestion causes switch 109 to implement the buffer-to-buffer credit mechanism between switch 107 and switch 109, no frames can travel from host 113 to host 115 through the link connecting switch 107 and switch 109 even though the true point of congestion is the network 151. Frames can no longer be transmitted to host 115 or to network 151 because of congestion in the network 151 or disk array 153.

It should be noted that frames are generally layer two constructs that include the layer three packet constructs. Frames and packets will generally be used interchangeably herein to describe network transmissions. It should also be noted that although the point of congested here is the network 151, other contemplated points of congestion can be a host 115 or a disk array 153 connected to a switch 109.

Because switch 107 can no longer transmit to switch 109, switch 107 may have to implement the same buffer-to-buffer credit mechanism with switches 103 and 105. When switches 103 and 105 can no longer transmit to switch 107, switches 103 and 105 may have to implement a buffer-to-buffer credit mechanism with switch 101. Congestion consequently can cascade throughout the network. The cascading congestion phenomenon can be referred to as congestion spreading.

The techniques of the present invention provide mechanisms for reducing congestion at a shared resource that may result in a variety of deleterious effects.

Figure 2:
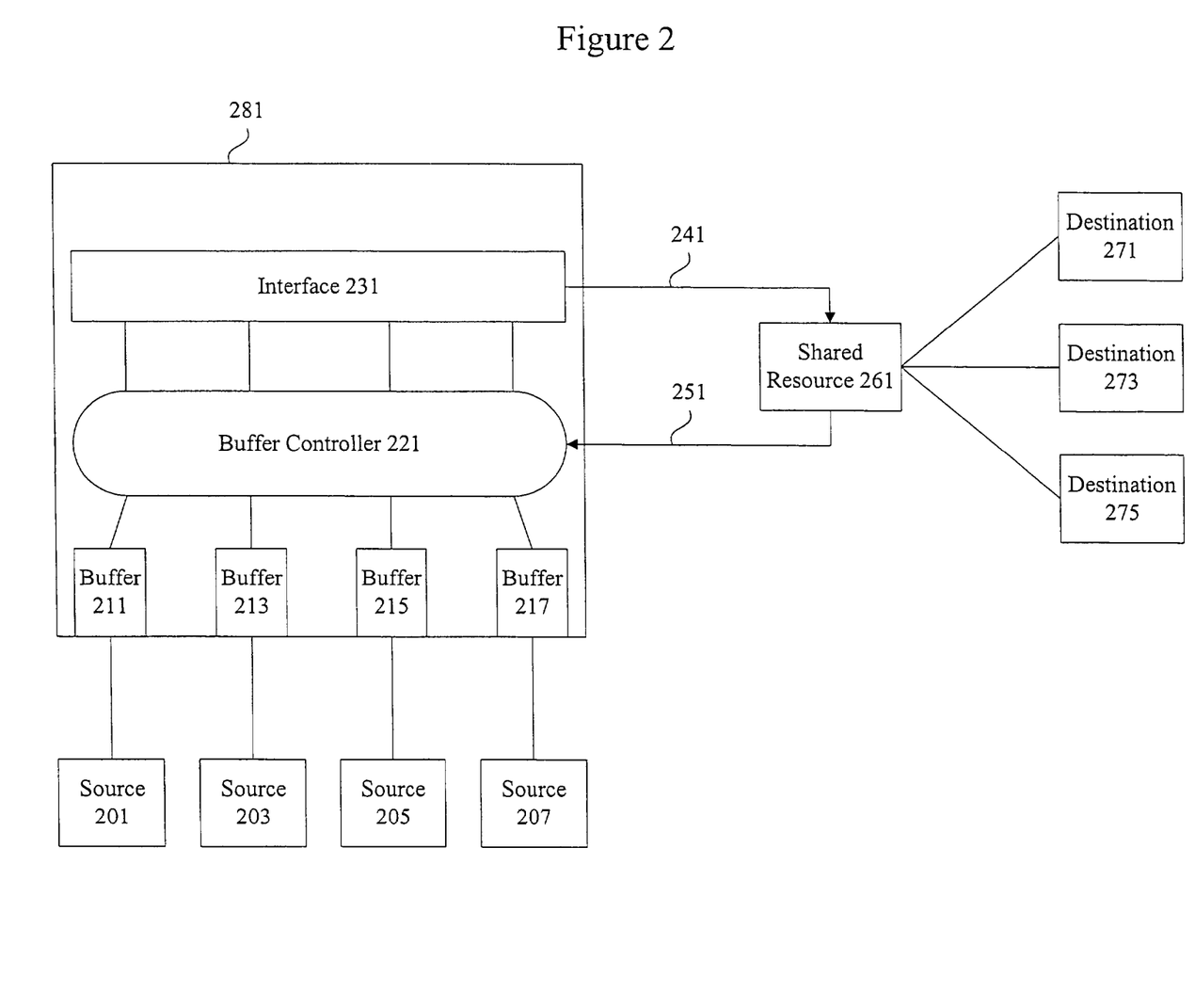
FIG. 2 is a diagrammatic representation of a system that can use the techniques of the present invention.

FIG. 2 is a diagrammatic representation showing one example of a point of congestion in a fiber channel network. The shared resource 261 is coupled to a number of destinations 271, 273, and 275. In one example, the shared resource 261 is a switch. In another example, the shared resource 261 is a component in a switch. The shared resource 261 is coupled to a buffer controller 221 through a credit line 251 and to an interface 231 through a data line 241. The buffer controller 221 typically is configured to receive data from buffers associated with a plurality of sources. In this example, the buffer controller 221 is configured to pull data from buffers 211, 213, 215, and 217 associated with source nodes 201, 203, 205, and 207, respectively.

In some examples, the buffer controller 221 pulls data from the buffers and sends the data to an interface 231 that provides the data to the shared resource 261 over the data line 241. The buffer controller is also configured to receive credits from the shared resource 261 on the credit line 251. In some examples, the credits received over credit line 251 are generic credits not associated with any particular buffer. When a credit is received over credit line 251, the buffer controller 221 pulls data from one of the buffers 211, 213, 215, and 217 typically in round robin fashion. Because the credits provided by shared resource 261 are not associated with any particular buffer, congestion can occur at the shared resource 261.

In one example, source 201 is sending traffic to destination 271 using buffer 211. Source 203 is sending data to destination 273 using buffer 213. When data can be freely transmitted to destinations 271 and 273 through the shared resource 261, data is pulled by the buffer controller 221 from the buffers 211 and 213 and sent to the shared resource 261 for transmission to destinations 271 and 273. The shared resource 261 in turn promptly sends credits back to the buffer controller 221 as soon as data is transmitted towards destinations 271 and 273. When the buffer controller 221 receives the credits, the buffer controller 221 can then again pull data from buffers 211 and 213. In typical embodiments, the buffer controller 221 can only pull data when credits are available. If the shared resource 261 does not provide the buffer controller 221 with any credits, the buffer controller 221 does not pull any data from the various buffers.

A problem arises when the destinations such as destination 271 becomes congested. The buffer controller will continue to pull data in a relatively equal manner from buffers 211 and 213 and place the data in the shared resource 261. Because the destination 271 is congested, the shared resource is only able to transmit to destination 273. Consequently, the shared resource will only be able to send credits to the buffer controller when data is transmitted to destination 273. When the buffer controller 221 receives the credits, the buffer controller will continue to pull data from both buffers 211 and 213 even though the data in buffer 211 is destined for a congested link. In one example, the traffic from buffer 211 will use up the buffer space associated with shared resource 261, preventing data in buffer 213 from being transmitted to uncongested destination 273. Consequently, congestion in the line associated with destination 271 prevents traffic from flowing to uncongested destination 273.

Figure 3:
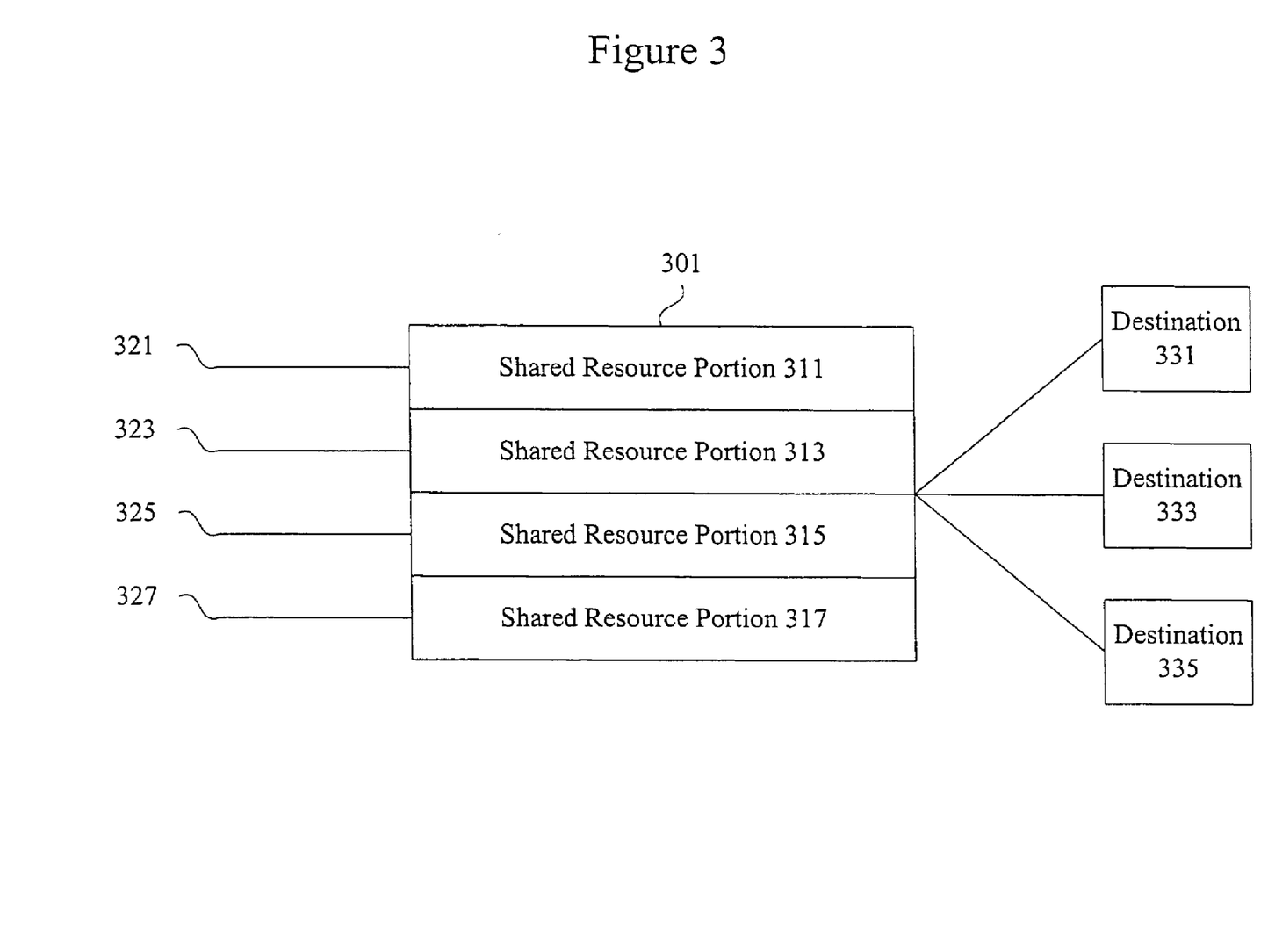
FIG. 3 is a diagrammatic representation of a system that divides the shared resource amongst the plurality of ports.

A variety of techniques are used to alleviate the effects of congestion at a shared resource 261. Some techniques are described in [ANDIP002]. Other mechanisms including dividing the shared resource 261 on a per buffer basis. FIG. 3 is a diagrammatic representation showing a shared resource divided to provide various input buffers with the predetermined amount of buffer space on the shared resource. The shared resource 301 is essentially no longer shared. Portions 311, 313, 315, and 317 are allocated for lines 321, 323, 325, and 327 associated with the various input ports. When a packet is forwarded from a portion of the shared resource 301 to a particular destination, the credit is provided specifically to the port associated with the portion of the shared resource. In one example, a packet in portion 311 is forwarded to destination 331. A credit is then provided to the port associated with line 321.

In another example, if a packet in portion 313 is forwarded to destination 333, the credit is provided to the input port associated with line 323. However, because the resource is divided into separate portions, the use of the resource 301 is not maximized because one line may have a large amount of traffic that needs buffering while other lines may not have much traffic. In one example, a large mount of traffic from line 321 may be filling the portion 311 while portions 313, 315, and 317 remain largely unused.

Figure 4:
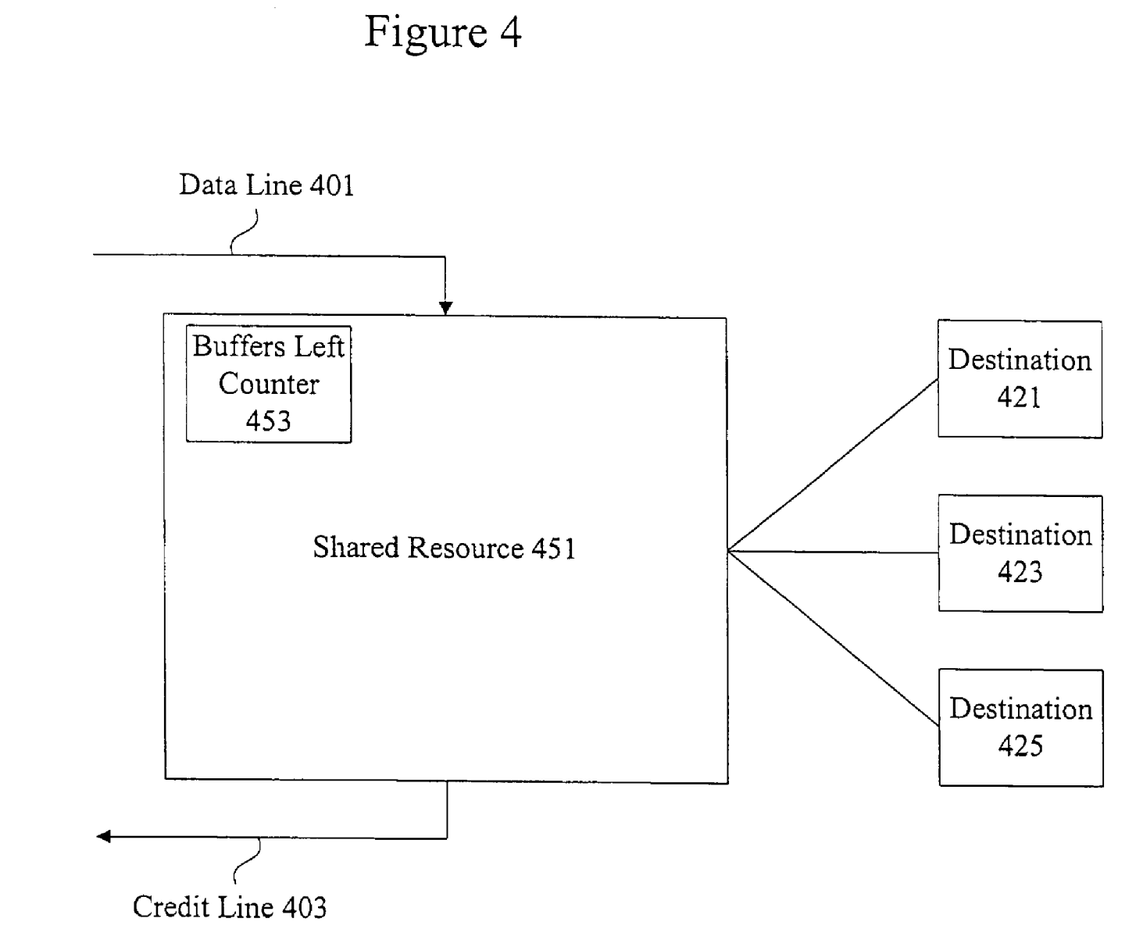
FIG. 4 is a diagrammatic representation of a system that has a shared state.

Having a resource that is not shared decreases shared resource efficiency. Consequently, the techniques of the present invention provide mechanisms for controlling congestion at a shared resource that is truly shared by the various input lines. FIG. 4 is a diagrammatic representation of a shared resource that efficiently and effectively allocates space to data from the various input lines. According to various embodiments, the buffer controller tracks the usage level of the shared resource. Any mechanism for forwarding data to the shared resource and maintaining credit information for pulling data from various input lines is referred to herein as a buffer controller. In one example, the buffer controller keeps track of the level of usage of the shared resource. For example, if the shared resource is less than 90 percent full, then the shared resource is identified as being in the shared state. When the shared resource is more than 90 percent full, then the shared resources is identified as being in the depleted state. The shared resource itself may also maintain the depletion threshold counter. Any level for delineating between a state where a shared resource can be fully shared and a state where the shared resource is nearly depleted is referred to herein as a depletion threshold.

In one example, a buffer controller continuously pulls data from various input buffers and sends the data over data line 401 to the shared resource 451 as long as the shared resource 451 is in the shared state. The shared resource 451 provides credits over credit line 403 to the buffer controller for the data that the shared resource sends out to destinations 421, 423, and 425. While the buffer controller has the needed credits, the buffer controller continues to pull traffic from the various input buffers typically in round-robin fashion and forwards the data over data line 401 to the buffer controller 451. It should be noted that the shared resource 451 may be almost entirely filled with traffic from a particular line. The techniques of the present invention allow for this situation when the shared resource is in its shared state. The techniques of the present invention allow the shared resource to be fully and effectively used to buffer traffic destined for a line that may be temporarily congested.

In typical implementations, data from a specific input buffer destined for a specific output line is typically passed to the shared resource by the buffer controller. However, the credit pass back to be buffer controller typically is not associated with a particular input buffer or a particular output line. Consequently, the credit is allocated usually in round-robin fashion to an input port that has data to be pulled. The credit is usually granted as soon as the packet is transmitted to a particular destination. In one example, if nothing is in the buffer and there is no congestion, the buffer controller can pull a packet from an input buffer, pass the packet to the shared resource, and the shared resource can immediately transmit the packet to a destination and provide the credit back to the buffer controller. However, if there is congestion associated with a particular destination, the shared resource may not immediately be able to transmit the packet to the congested destination and consequently will not be able to provide the credit immediately back to the buffer controller.

The techniques of the present invention recognize that if a credit is not very quickly received after the forwarding of data to a shared resource, the destination associated with the data is likely to be congested. This is not necessarily a problem if the shared resource is largely unused, as having plenty of buffer space is one of the very purposes of using a shared resource buffer. However, when the shared resource buffer is nearly full, receiving too much traffic destined for a congested destinations may needlessly block traffic destined for uncongested destinations. Consequently, the techniques of the present invention identify a depleted state, when a buffer controller blocks data from particular input buffers.

The input buffer associated with the data destined for a congested output line is likely to have more data destined for that congested output line. The techniques of the present invention provides mechanisms for blocking a particular input port upon recognizing that a credit is not quickly received after the forwarding of data to a shared resource. This assumption can be made even though the credit provided by the shared resource provides no information as to what input port and what destination the forwarded data is associated with. Furthermore, this assumption can be made even though the credit provided by the shared resource may happen to have resulted from the transmission of a different data packet already in the shared resource buffer with different source and destination characteristics than the packet just received. For example, there may be a single data packet referred to herein as a first packet designated for transmission to destination 423 in the shared resource buffer.

When a data packet referred to as a second packet is forwarded from the buffer controller to the shared resource, the destination of the second data packet may be congested and consequently the data packet may be buffered in the shared resource. It may be desirable here to block traffic on the port associated with the second data packet. However, because the first packet is forwarded to destination 423 at approximately the same time the second packet is received from the buffer controller, the credit is provided to the buffer controller and the buffer controller does not block the port associated with the second packet.

Figure 5:
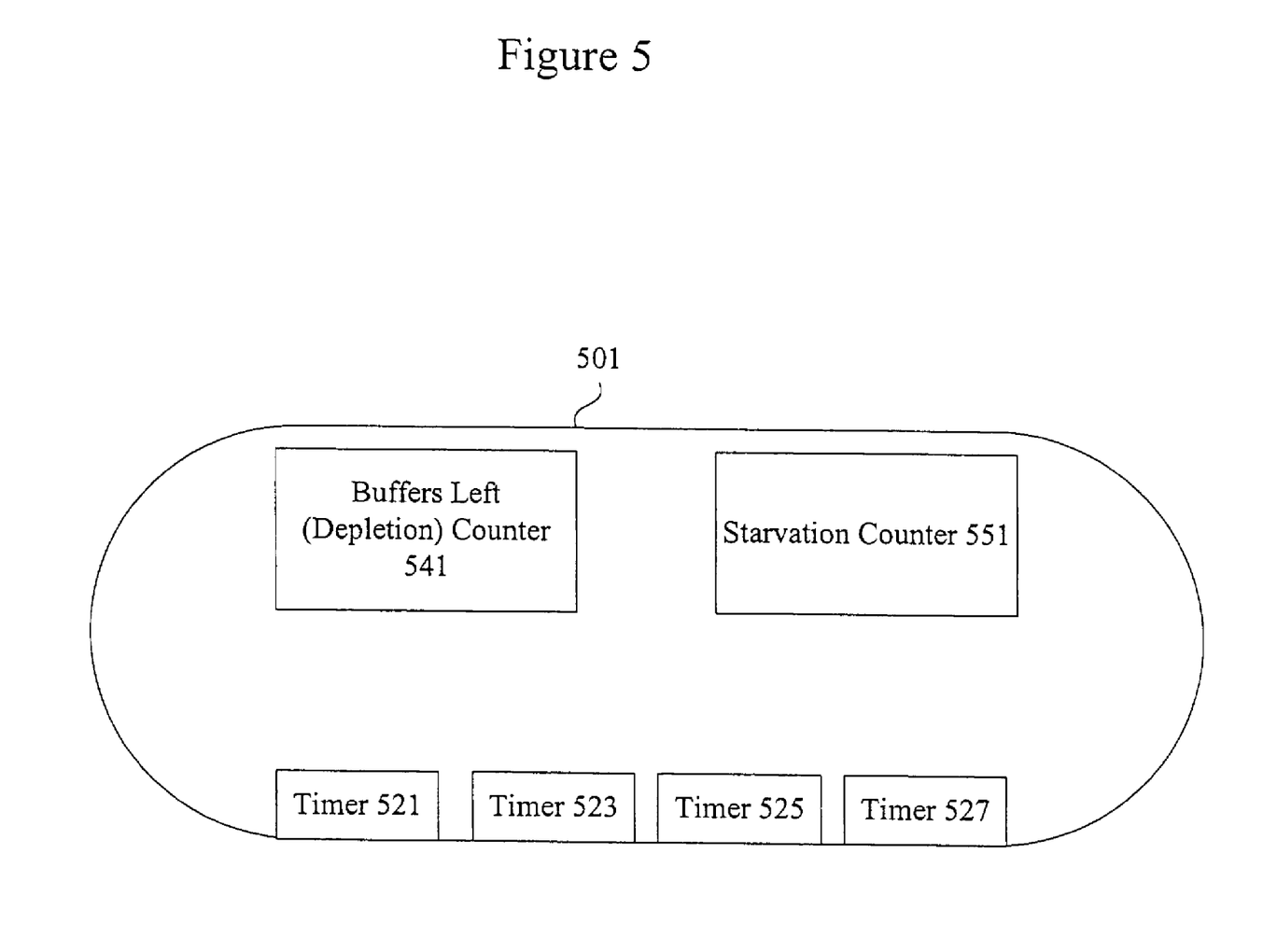
FIG. 5 is a diagrammatic representation showing a controller.

FIG. 5 is a diagrammatic representation showing various counters and timers associated with a buffer controller that can be used to determine when an input port should be blocked. According to various embodiments, the buffer controller 501 includes a buffers left counter or depletion counter 541 that tracks the state of the shared resource. As noted above, the shared resource may be in one of several states. In one example, when the shared resource is in a shared state, data is pulled from the input buffers and immediately forwarded to the shared resource if credits are available. If one data unit can be forwarded for every credit, then the number of data units forwarded may be based on the number of credits available.

However, when the shared resource is in a depleted state, only one data unit is sent at a time even if multiple credits are available. In one instance, a data unit is sent and a subsequent data unit is not sent until a credit is received. The depletion counter can be used to track whether the shared resource is in a shared or depleted state. It should be noted that a variety of other states are also contemplated, such as critically depleted.

In one embodiment, if the shared resource is in the shared state, data units are simply forwarded when credits are available. When the shared resource is in the depleted state as indicated by the depletion counter 541, input ports may be blocked if a data unit forwarded from an input port does not result in a credit being sent back to the buffer controller 501 before a congestion latency elapses. The congestion latency can be measured using one or more timers 521, 523, 525, and 527.

According to various embodiments, buffer controller 501 is associated with one or more timers 521, 523, 525, and 527 associated with various ports. In some examples, a single timer is used. In other examples, multiple timers are used. The timers track the latency between pulling a packet from one of the input buffers and receiving a credit from the shared resource. In one example, the timer is used to measure if the latency exceeds a congestion latency. Any predetermined period of time between pulling data from an input buffer and receiving a credit from a shared resource that indicates that the data could not promptly be forwarded by the shared resource is referred to herein as congestion latency. According to various embodiments, the congestion latency is a value that varies based on specific components used and consequently is determined empirically and set by a system administrator. In one example, the congestion latency is set to the maximum delay between transmission of back to back packets from the shared resource to an uncongested destination.

A starvation counter 551 can also be included. In some examples, a starvation counter 551 is used to prevent an input port from being blocked for an exceedingly lengthy a period of time. As noted above, an input port may be blocked if the shared resource is in the depleted state and a credit is not returned to the buffer controller after forwarding of a data unit within a predetermined period of time. The input port is typically blocked until the shared resource is no longer in the depleted state. However, it is possible that the shared resource remains in the depleted state for an extended period of time. In one example, even though no additional traffic is coming from the blocked input port, the other input ports may be feeding data to the shared resource at a rate that maintains the shared resource in the depleted state. In fact, the blocked input port may continue to be blocked even after congestion is reduced on the output line associated with the data from the input port.

Consequently, the techniques of the present invention provide a starvation counter that prevents a particular input port from being blocked indefinitely. Mechanisms for keeping track of time elapsed or data units transmitted since an input port has been blocked are referred to herein as a starvation counter. In one example, the blocked input port is automatically unblocked after a set number of packets have been forwarded to be shared resource, from any input port. In one example, an input port is blocked after 100 or 1,000 packets have been forwarded to the shared resource. In another example, input port is in blocked after 20 seconds of blockage. According to various embodiments, there may be one or more starvation counters associated with the various ports in the buffer controller.

Figure 6:
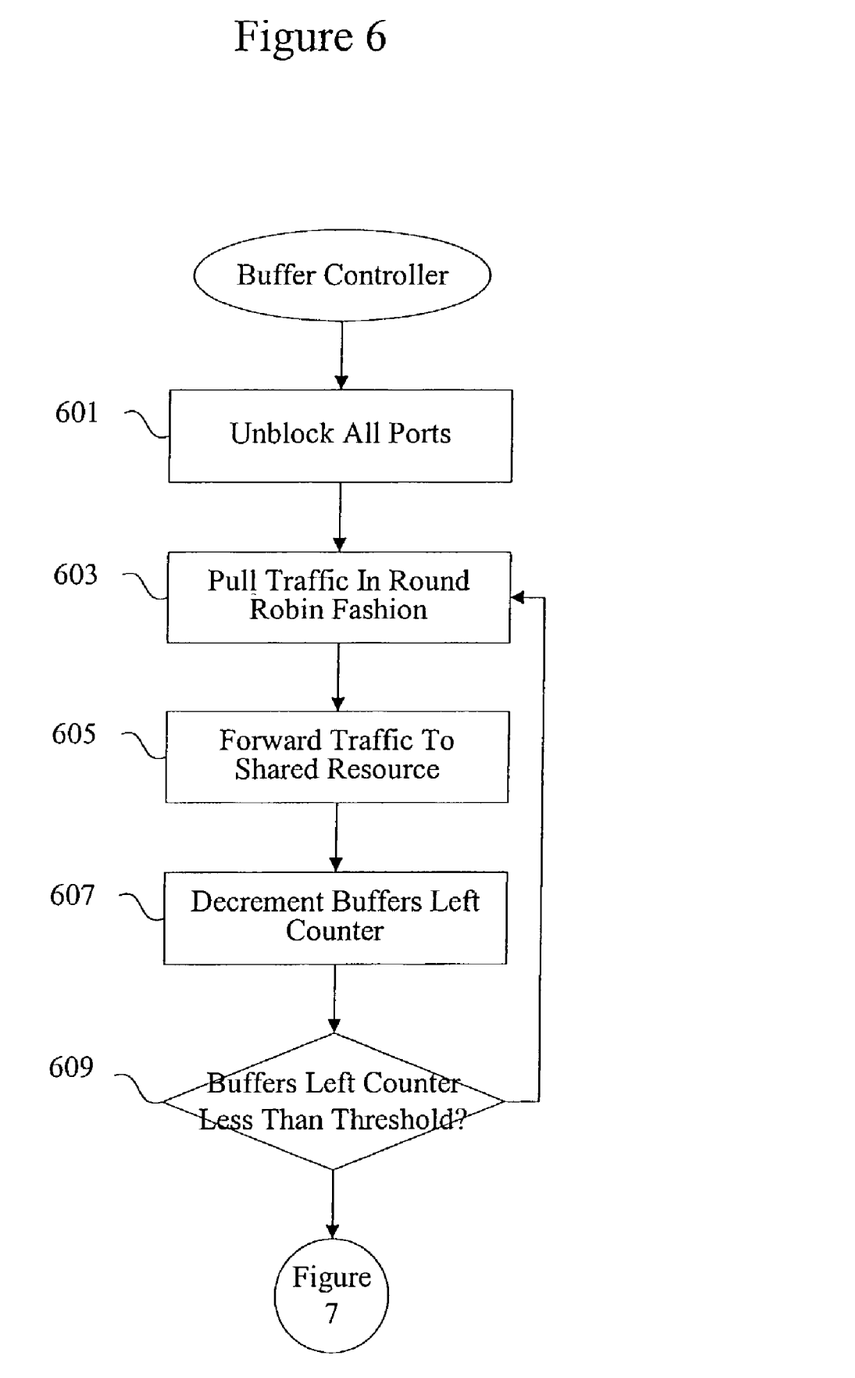
FIG. 6 is a flow process diagram showing operation when the shared resource is in a shared state.
Figure 7:
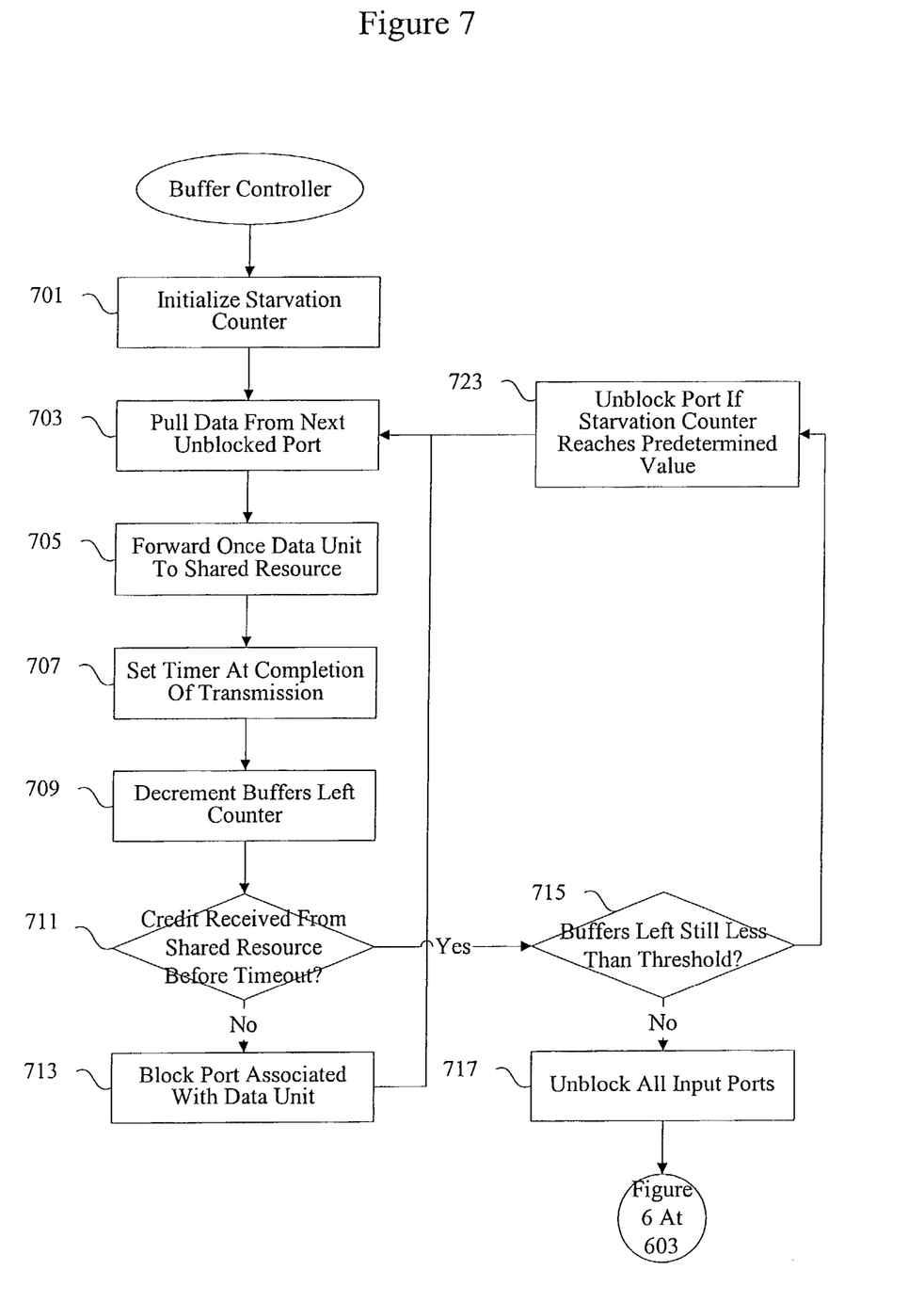
FIG. 7 is a flow process diagram showing operation when the shared resource is in a depleted state.

FIG. 6 is a flow process diagram showing techniques at a buffer controller. At 601, all ports are initially unblocked. In one example, unblocking all ports means that all ports are unmasked. At 603, traffic is pulled from the various input ports in round-robin fashion as credits allow. More than one data unit may be pulled from a port at a time. At 605, traffic is forwarded to the shared resource. At 607, a counter used to determine if the shared resource remains in the shared state is adjusted. In one example, the counter is a buffers left counter decremented to indicate that fewer free buffers remain in the shared resource. If the buffers left counter is less than the depletion threshold, it means that buffers in the shared resource are largely depleted. In the depleted state, traffic is sent to the shared resource in a more systematic manner as indicated in FIG. 7. Otherwise, the shared resource is still in the shared state as indicated by the buffers left counter being greater than the depletion threshold. Traffic is then again pulled in round-robin fashion as indicated at 603. It should be noted that a wide variety of mechanisms can be used to track buffer levels, depletion thresholds, etc. Consequently, it will be appreciated that a variety of counters and mechanisms can be incremented or decremented to achieve the same results for determining if the shared resource is in a depleted state.

FIG. 7 is a flow process diagram showing a buffer controller operating when a shared resource is in a depleted state. At 701, a starvation counter is set to prevent an input port from being blocked for an indeterminate period of time. At 703, data is pulled from the next unmasked or unblocked port. At 705, one data unit is forwarded to the shared resource. At 707, the timer is set at the completion of the transmission of the data unit. At 709, the buffers left counter is used to measure whether the shared resource is in the depleted state is decremented. At 711, if a credit is received by the buffer controller before the congestion latency elapses, then it is determined at 715 if the buffers left counter is less than the depletion threshold. It should be noted that a buffer controller is receiving credits from a shared resource as a thread of operation not dependent on the process flows shown in FIGS. 6 and 7. According to various embodiments, the buffers left counter is both incremented and decremented to track the number of buffers remaining in the shared resource. In one example, the buffers left counter is incremented whenever a buffer becomes available in the shared resource.

If the buffers left counter is less than the depletion threshold, then the shared resource remains in the depleted state. According to various embodiments, the starvation counter is then checked to ensure that no port has been blocked for an excessive period of time. In one instances, a port is unblocked if a predetermined number of packets have been forwarded and the port has not been unblocked. In another example, the port is unblocked if a predetermined period of time has elapsed. After the starvation counter is checked, data continues to be pulled at 703 one data unit at a time. If the shared resource is no longer in a depleted state, then all ports are unmasked or unblocked at 717 and the flow continues as indicated at 603 in FIG. 6. If a credit is not received before a congestion latency elapses, the input port associated with the transmitted data is blocked or masked at 713.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. Instructions such as quench messages can be sent at a variety of different times. It is therefore intended that the invention be interpreted to include all variations and equivalents that fall within the true spirit and scope of the present invention.

What is claimed is:

1. A method, comprising:
   identifying a received data sequence at a buffer controller in a fibre channel network, the received data sequence having a source corresponding to a port among a plurality of ports coupled to the buffer controller and having a destination reachable through a shared resource coupled to the buffer controller, wherein the shared resource is used by traffic associated with the plurality of ports coupled to the buffer controller to reach a plurality of destinations;
   forwarding the received data sequence to the shared resource;
   receiving a transmission credit from the shared resource, wherein the port associated with the received data sequence is blocked after the transmission credit is received if the transmission credit is not received from the shared resource within a predetermined period of time.

2. The method of claim 1, wherein the port is blocked if the transmission credit is not received within a period of time identified as a congestion latency.

3. The method of claim 1, wherein the port is blocked by masking the port.

4. The method of claim 1, wherein data is forwarded to the shared resource from the plurality of ports in round robin fashion.

5. The method of claim 1, wherein the plurality of ports are coupled to a plurality of fibre channel switches.

6. The method of claim 1, wherein the plurality of destinations comprise fibre channel switches, hosts, and disks.

7. The method of claim 1, wherein the shared resource is in a depleted state when the received data sequence is sent to the shared resource.

8. The method of claim 7, wherein the port associated with the received data sequence is unblocked when the shared resource is no longer in the depleted state.

9. The method of claim 7, wherein the shared resource is no longer in the depleted state and enters the shared state when the number of free buffers associated with the shared resource is greater than a depletion threshold.

10. The method of claim 7, wherein the shared resource is a memory and the depletion threshold indicates the level when fewer than 10% of total buffers remain.

11. The method of claim 7, wherein the port associated with the received data sequence is unblocked when a starvation criterion is reached.

12. The method of claim 11, wherein the starvation criterion is reached when a predetermined number of data sequences have been forwarded by the shared resource and the port associated with the received data sequence has not been unblocked.

13. The method of claim 11, wherein the starvation criterion is reached after a predetermined period of time has elapsed.

14. An apparatus comprising:
   means for identifying a received data sequence at a buffer controller in a fibre channel network, the received data sequence having a source corresponding to a port among plurality of ports coupled to the buffer controller and having a destination reachable through a shared resource coupled to the buffer controller, wherein the shared resource is used by traffic associated with the plurality of ports coupled to the buffer controller to reach a plurality of destinations;
   means for forwarding the received data sequence to the shared resource;
   means for receiving a transmission credit from the shared resource, wherein the port associated with the received data sequence is blocked after the transmission credit is received if the transmission credit is not received from the shared resource within a predetermined period of time.

15. The apparatus of claim 14, wherein the predetermined period of time is a congestion latency.

16. The apparatus of claim 14, wherein the port is blocked by masking the port.

17. The apparatus of claim 14, wherein data is forwarded to the shared resource from the plurality of ports in round robin fashion.

18. The apparatus of claim 14, wherein the plurality of ports are coupled to a plurality of fibre channel switches.

19. The apparatus of claim 14, wherein the plurality of destinations comprise fibre channel switches, hosts, and disks.

20. The apparatus of claim 14, wherein the shared resource is in a depleted state when the received data sequence is sent to the shared resource.

21. An apparatus comprising:
   a plurality of input ports configured to receive data sequences having destinations reachable through a shared resource,
   a buffer controller configured to pull a received data sequence from one of the plurality of input ports, forward the received data sequence to the shared resource, and receive a transmission credit from the shared resource after a predetermined period of time has elapsed, wherein an input port associated with the received data sequence is blocked after the transmission credit is received to control congestion in a fibre channel network if the transmission credit is not received from the shared resource within a predetermined period of time.

22. The apparatus of claim 21, wherein the port is blocked if the transmission credit is not received within a period of time identified as a congestion latency.

23. The apparatus of claim 21, wherein the port is blocked by masking the port.

24. The apparatus of claim 21, wherein data is forwarded to the shared resource from the plurality of ports in round robin fashion.

25. The apparatus of claim 21, wherein the plurality of ports are coupled to a plurality of fibre channel switches.

26. The apparatus of claim 21, wherein the plurality of destinations comprise fibre channel switches, hosts, and disks.

27. The apparatus of claim 21, wherein the shared resource is in a depleted state when the received data sequence is sent to the shared resource.

28. The apparatus of claim 27, wherein the port associated with the received data sequence is unblocked when the shared resource is no longer in the depleted state.

29. The apparatus of claim 27, wherein the shared resource is no longer in the depleted state and enters the shared state when the number of free buffers associated with the shared resource is greater than a depletion threshold.

30. The apparatus of claim 27, wherein the shared resource is a memory and the depletion threshold indicates the level when fewer than 10% of total buffers remain.

31. The apparatus of claim 27, wherein the port associated with the received data sequence is unblocked when a starvation criterion is reached.

32. The apparatus of claim 31, wherein the starvation criterion is reached when a predetermined number of data sequences have been forwarded by the shared resource and the port associated with the received data sequence has not been unblocked.

33. The apparatus of claim 31, wherein the starvation criterion is reached after a predetermined period of time has elapsed.

* * * * *